United States Patent
Okamura

(10) Patent No.: US 7,017,009 B2
(45) Date of Patent: Mar. 21, 2006

(54) CACHE MEMORY DEVICE

(75) Inventor: Atsushi Okamura, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 290 days.

(21) Appl. No.: 10/098,290

(22) Filed: Mar. 18, 2002

(65) Prior Publication Data
US 2002/0138699 A1   Sep. 26, 2002

(30) Foreign Application Priority Data
Mar. 21, 2001  (JP) .............................. 2001-081320

(51) Int. Cl.
*G06F 12/00*  (2006.01)
(52) U.S. Cl. ...................... 711/136; 711/139; 711/138; 711/128
(58) Field of Classification Search ................ 711/138, 711/139, 128, 133, 136; 710/22
See application file for complete search history.

(56) References Cited

U.S. PATENT DOCUMENTS

| | | | |
|---|---|---|---|
| 5,745,728 A | * | 4/1998 | Genduso et al. ............ 711/126 |
| 5,963,981 A | * | 10/1999 | Martin ....................... 711/170 |
| 6,526,483 B1 | * | 2/2003 | Cho et al. ................... 711/154 |

OTHER PUBLICATIONS

Intel, "Pentium Processor User's Manual vol. 2: 82496 Cache Controller and 82491 Cache SRAM Data Book", Intel Corp. 1993, pp. 1-9, 1-14, 2-1, 3-8, and 4-5 to 4-6.*

* cited by examiner

*Primary Examiner*—Reginald G. Bragdon
(74) *Attorney, Agent, or Firm*—McGinn IP Law Group, PLLC

(57) ABSTRACT

A cache memory device with a cache section, which is provided between a CPU and a main memory and operates as a fast buffer memory, has a capability of storing input data in the cache section when attribute information affixed to the input data indicates a predetermined attribute.

6 Claims, 7 Drawing Sheets

CACHE MEMORY DEVICE

BACKGROUND OF THE INVENTION

1. Field of the Invention

The present invention relates to a cache memory device, and, more particularly, to a cache memory device which suppresses the occurrence of replacement of data between a cache and a main memory in data processing such as communication control.

2. Description of the Prior Art

A communication control apparatus is provided to mutually connect computer networks constructed by the Ethernet or the like and control mutual communications among the networks. FIG. 6A is a block diagram of a router which is one example of the communication control apparatus and FIG. 6B is a diagram showing the structure of a packet. A header 11 includes information, such as the IP address of a sender and the MAC address of a transmission destination, communication data 12 is a data body to be transmitted, and a trailer 13 includes error check information.

A communication control apparatus 61 receives packet data P1 from a network to which the apparatus 61 is connected, identifies the IP address of a machine/unit which is connected to a network which is where the data is to be sent, selects a route to transfer by referring to a route table, updates the MAC address portion of the header and sends out packet data PO. The following describes an operation that is carried out here. In the communication control apparatus 61, a DMA (Direct Memory Access) 65 transfers a packet 10 received by a network I/O unit 64, connected to a system bus 62, to a main memory 69, constructed by a DRAM, via a memory interface 68 connected to the system bus 62 and writes the packet 10 there, after which a CPU 63 refers to the IP address of the received packet and updates the MAC address. For faster processing of the CPU 63, the communication control apparatus 61 has a cache memory device 67 which constitutes a write-back type secondary cache between the CPU 63 and the main memory 69. Because of the possibility that data in the main memory 69 may be later than data in the secondary cache (cache memory device 67), however, data in the cache memory device 67 is temporarily invalidated by using a cache invalidate command or a coherency protocol command, and then the cache memory device 67 is accessed via a CPU bus 66. As a packet to be accessed is not located in the cache memory device 67 due to the invalidation of the data, the cache memory device 67 reads out data from the main memory 69 via the memory interface 68. Then, the CPU 63 reads out a part of the packet 10 including the header 11 from the cache memory device 67, updates the MAC address portion of the header 11 and writes the resultant data in the cache memory device 67. The packet with the updated header 11 is written back (flushed) into the main memory 69 from the cache memory device 67 in response to a command from the CPU 63, is then transferred via the memory interface 68 and the system bus 62 to the network I/O unit 64 from the main memory 69 by the DMA 65, and is transferred to another network from the network I/O unit 64.

FIG. 7 is an internal block diagram of the conventional cache memory device 67. The cache device 67 has an n-way cache section 72 which includes n (a positive integer equal to or greater than 2) ways from a first way 71-1 to an n-th way 72-n each including m (a positive integer equal to or greater than 2) entries each having a pair of a tag portion for storing a tag address and a data portion for storing data. That is, the cache section 72 includes n ways each capable of storing m tag and data pairs. The cache section 72 may be considered as having m sets that can designate n entries from the first way 71-1 to the n-th way 71-n with the same index address. Although not illustrated, a valid bit which indicates the valid/invalid state of data stored in each entry of the cache section 72 and a dirty bit or the like which indicates a state where data on the cache has been updated but has not been written back into the main memory are provided in association with each entry. The cache memory device 67 further includes n comparison circuits 73-1 to 73-n, an OR circuit 74 and a selection circuit 75. Each of the comparison circuits 73-1 to 73-n detects a match between a tag address stored in a tag portion that is specified by an index address ADI in an address Ad (see FIG. 4B) having a tag field, an index field and a line field and an address ADT of the tag field of the address AD. The OR circuit 74 sets a hit signal HIT active when a match is detected by those comparison circuits and sends the hit signal HIT to a control circuit 77. The selection circuit 75 selects a block of the way (including data of plural lines of line addresses) that corresponds to the comparison circuit which has detected a match when an access made by the CPU 63 is a read access. The cache memory device 67 also includes an LRU (Least Recently Used) memory section 76 that stores a block which belongs to a set comprising blocks of n ways which have the same index address and which has not been used for the longest period of time for each set, as a push-out candidate block LRUB. The control circuit 77 controls writing and reading of a tag address and data to and from the cache section 72, replacement of data and so forth.

In case where the CPU 63 accesses the cache memory device 67 via the CPU bus 66, when none of the tag addresses of n entries in the set that is specified by the index address ADI of the address AD from the CPU 63 coincides with the address ADT of the tag field of the address AD, i.e., when a mishit (or "miss") has occurred, the push-out candidate block LRUB registered in the LRU memory section 76 is extracted from the set that is indicated by the index address ADI, the tag address and data in the associated entry in the cache section 72 are replaced with the tag field portion and data at the address in the main memory 69 that is indicated by the address AD. Then, data of the block pushed out as the push-out candidate block LRUB from the cache section 72 is sent to the main memory 69 via the system bus 62 and written in the associated area in the main memory 69 where the address ADT of the tag field corresponds to the index address ADI, all under the control of the control circuit 77.

When the CPU 63 makes a write access and detects a hit, dirty information is affixed to write data WD as the associated block in the cache section 72 is rewritten through a switch section 78 controlled by the control circuit 77. The dirty block data is rewritten in the main memory 69 when replacement occurs due to a mishit of an access made by the CPU 63 or the data in the main memory 69 is updated by executing flushing in response to a command from the CPU 63 before being transferred to the network I/O unit 64 from the main memory 69. In case of a mishit, data MD from the main memory 69 is sent to the cache section 72 via the switch section 78 controlled by the control circuit 77 and written there. Then, the CPU 63 performs overwriting of data in the cache section 72 and adds dirty information to the associated entry in the cache section 72.

In the conventional communication control apparatus 61 in FIG. 6A, the CPU 63 can access only the cache memory device 67 via the CPU bus 66 and the network I/O unit 64 can execute DMA with the main memory 69 via the system bus 62. The communication control apparatus 61 therefore requires a process of replacing data of the associated portion into the cache memory device 67 from the main memory 69 for each access made by the CPU 63 or flushing data updated by the CPU 63 into the main memory 69 from the cache memory device 67 prior to transfer to the network I/O unit 64, during a period from the reception of a packet PI from at the network I/O unit 64 to the renewal of its header and transmission of the resultant packet as a packet PO from the network I/O unit 64 by the CPU 63. The communication control apparatus 61 therefore undesirably takes a greater time in data exchange between the cache memory device 67 and the main memory 69 than processing in the CPU 63.

In addition, a portion of communication data 12 which is not used in updating communication control information is stored in the cache section 72 in the conventional cache memory device 67 without being discriminated adequately. This brings about a situation of pushing out data, such as data of a header portion which is likely to be used and data which is to be used when a command code and a command from the CPU are executed from the cache section 72 when communication data which is not used by the CPU is accessed. It is therefore necessary to perform data replacement when the pushed-out header data becomes necessary again. This leads to frequent replacement of data blocks between the cache memory device 67 and the main memory 69, thus lowering the hit ratio of the secondary cache and lowering the performance of the communication control apparatus 61 as a consequence.

BRIEF SUMMARY OF THE INVENTION

OBJECT OF THE INVENTION

Accordingly, it is an object of the invention to provide a cache memory device that selectively stores data which is likely to be frequently used in a cache section.

SUMMARY OF THE INVENTION

A cache memory device with a cache section, which is provided between a CPU and a main memory and operates as a fast buffer memory, has a capability of storing input data in the cache section when attribute information affixed to the input data indicates a predetermined attribute.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Figure 1A:
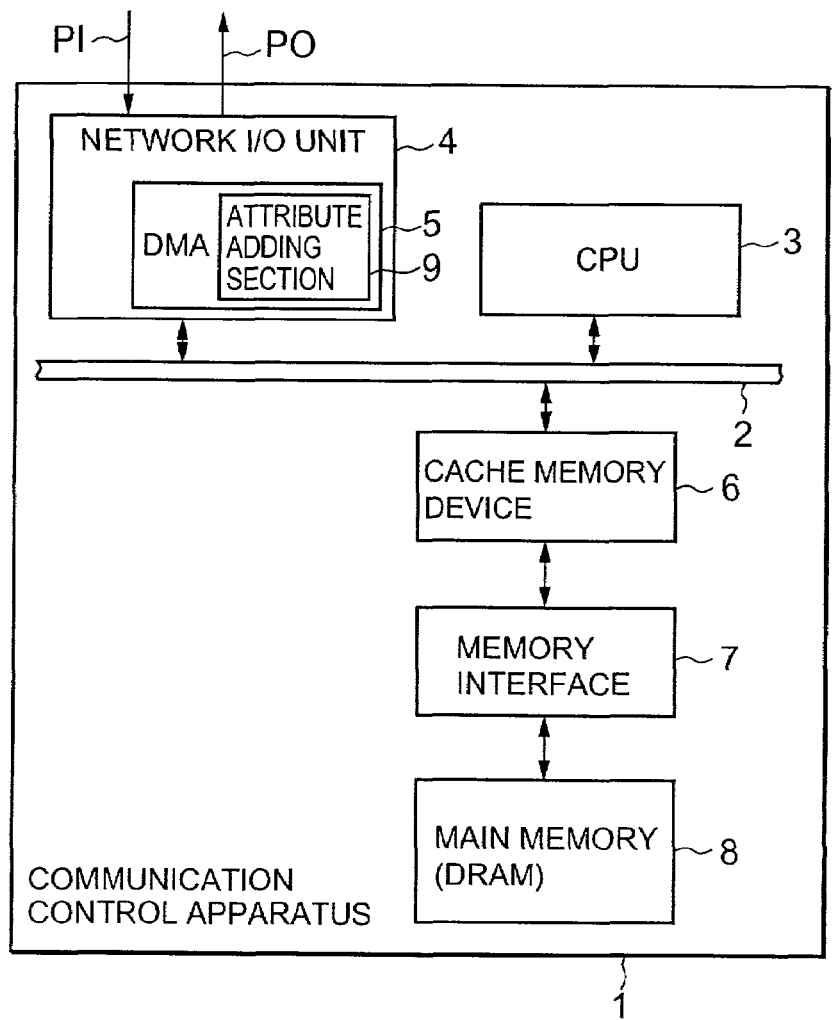
FIG. 1A is a block diagram of a communication control apparatus which is one embodiment of a data processing apparatus according to the invention and FIG. 1B is a diagram showing the structure of an attribute-affixed packet.

The invention will now be described referring to the accompanying drawings. FIG. 1A is a block diagram of a communication control apparatus which is one embodiment of a data processing apparatus according to the invention.

Figure 1B:
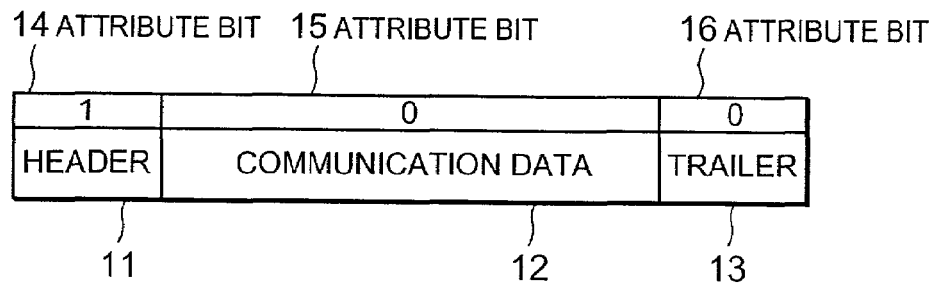
Figure 6A:
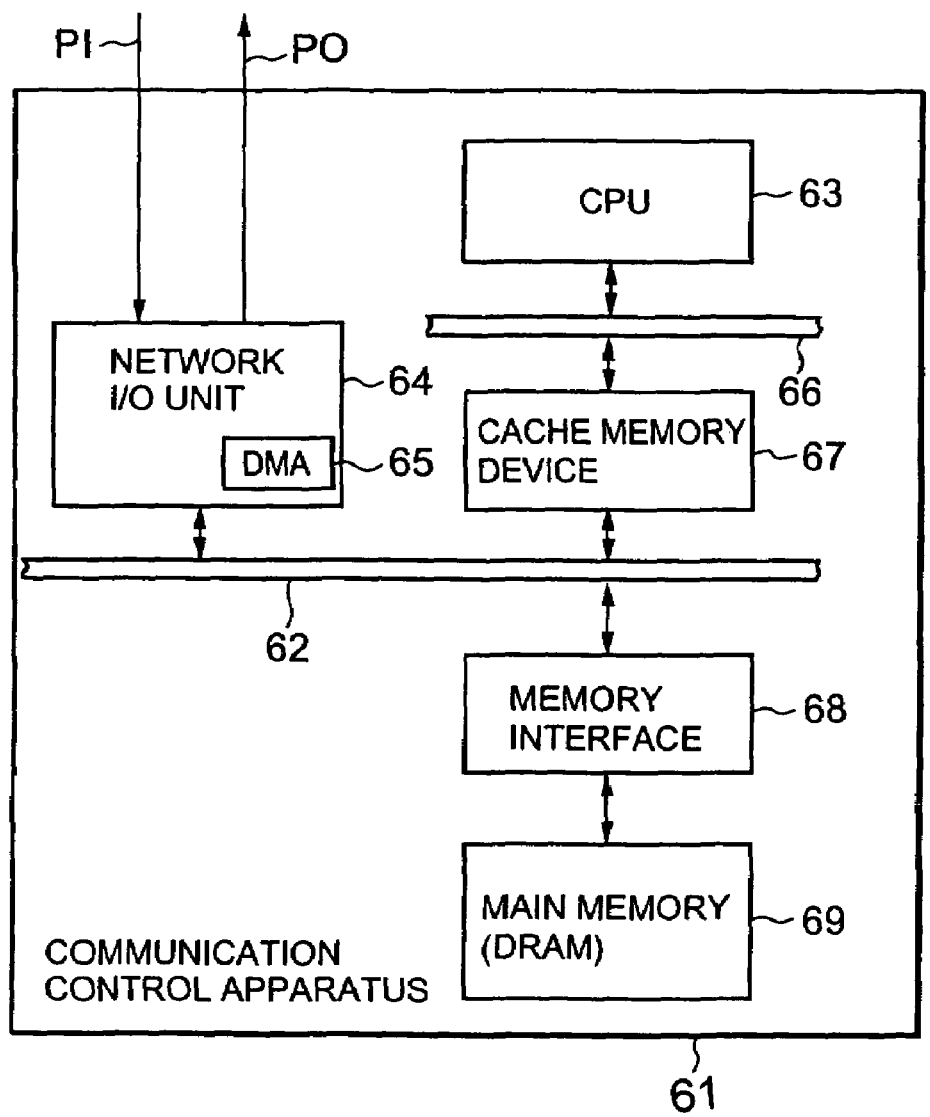
FIG. 6A is a block diagram of a conventional communication control apparatus and FIG. 6B is a diagram showing the structure of a packet.
Figure 6B:
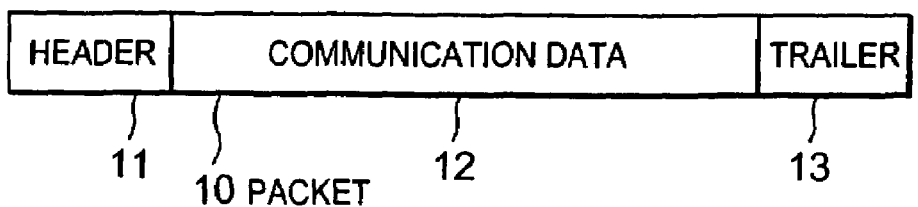

A communication control apparatus 1 includes a system bus 2, a CPU 3, a network I/O unit 4 and a cache memory device 6, the last three connected to the system bus 2. The cache memory device 6 is connected via a memory interface 7 to a main memory 8 which is constructed by a DRAM. As the communication control apparatus 1 performs DMA transfer directly to the cache memory device 6 from the network I/O unit 4, the communication control apparatus 1 can considerably reduce the number of shifts of data to the cache memory device 6 from the main memory 8 at the time the CPU 3 accesses DMA-transferred data, as compared with the conventional communication control apparatus 61 in FIG. 6. In DMA transfer in the opposite direction from the cache memory device 6 to the network I/O unit 4, data is directly transferred from the cache memory device 6 too. It is therefore possible to eliminate the flush process which temporarily writes dirty data back into the main memory and invalidates an associated entry before transfer and which has been needed in the conventional communication control apparatus 61. Further, a DMA 5 incorporated in the network I/O unit 4 has an attribute adding section 9. The DMA 5 respectively adds attribute bits 14, 15 and 16 to a header 11, a communication data 12 and a trailer 13 as shown in FIG. 1B and executes DMA transfer while setting the attribute bit 14 of the header 11 which is used at the time of referring to a route table to "1" and setting the attribute bit 15 of the communication data 12 which is not referred to by the CPU 3 to "0". FIG. 1B illustrates a case where the attribute bit 16 of the trailer 13 is also set to "0" and the attribute bit 14 of the header 11 alone is set to "1". Because the cache memory device 6 has a capability of discriminating data whose attribute bit is "1" from data whose attribute bit is "0" and allocating data whose attribute bit is "1" into a cache section, data needed by the CPU 3 is stored in the cache memory device 6. This significantly improves the hit ratio and reduces replacement of data between the cache memory device 6 and the main memory 8 that is originated from a mishit. In particular, replacement of data which is not accessed by the CPU 3 is suppressed, the process efficiency of communication control is improved.

The operation of the communication control apparatus 1 will now be described. The communication control apparatus 1 receives packet data PI from a network to which the apparatus 1 is connected, identifies the IP address of a transmission destination of the data, selects a route to transfer by referring to a route table, updates a part of the header according to the selected route and sends out packet data PO. A packet received by the network I/O unit 4, connected to the system bus 2, has the header 11 affixed with the attribute bit 14 of "1" indicating an allocation attribute to the cache section and the communication data 12 and the trailer 13 are respectively affixed with the attribute bits 15 and 16 of "0" indicating a non-allocation attribute. The packet is then DMA-transferred to the cache memory device 6 that is connected to the system bus 2 and used as a secondary cache. In the case where a bus transaction is carried out in a fixed size, a transaction which includes both the data portion of the allocation attribute and the data portion of the non-allocation attribute may be carried out, considering the entire data as having an allocation attribute as a whole. The cache memory device 6 stores the header 11 whose attribute bit is data with the allocation attribute of "1" in the cache section. In the case where the tag address of the transfer destination has a hit, data is written in an associated address in the cache section, whereas in the case where there is no hit, a block to be replaced is selected by the LRU method and is written in the main memory 8 after replacement of data and a tag address at an associated address in the main memory 8.

The CPU 3 reads out the header 11 from the cache memory device 6, checks routing information, updates a portion of the header 11 and returns the resultant data to the cache memory device 6. When the transmission destination of the packet is determined, the DMA 5 is activated to perform DMA transfer of a packet that has the header 11 allocated in the cache section of the cache memory device 6 and the communication data 12 and trailer 13, which have not been allocated in the cache section, to the network I/O unit 4 via the system bus 2. The packet is then transferred to another network from the network I/O unit 4.

Although the foregoing description has been given of the case where the header 11 alone is treated as data with the allocation attribute of "1", there may be a case where the hit ratio can be further improved if both the header and the trailer 13 are treated as data with the allocation attribute of "1" and only the communication data 12 is treated as data with the allocation attribute of "0".

Figure 2:
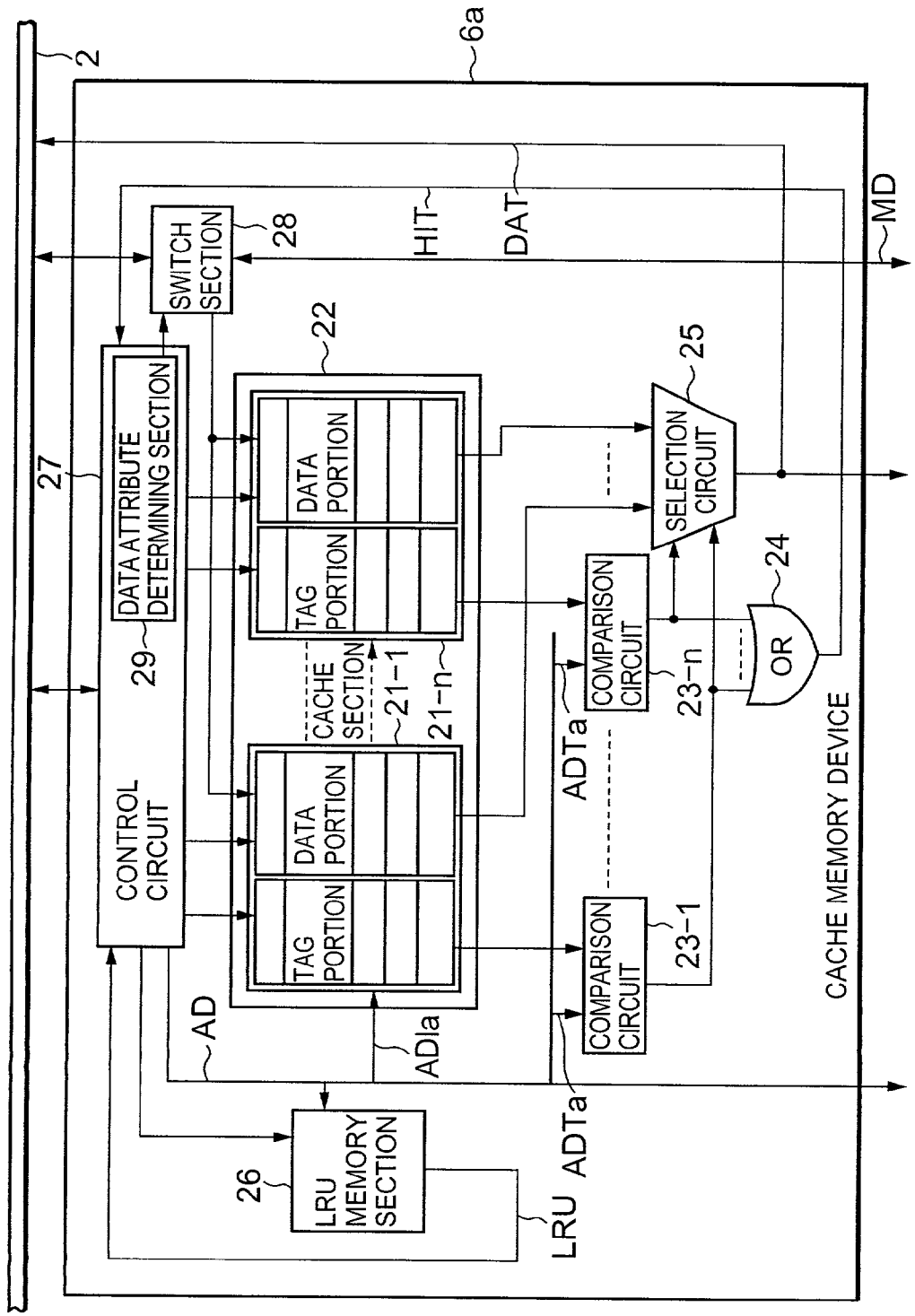
FIG. 2 is an internal block diagram of a cache memory device according to a first embodiment of the invention.
Figure 7:
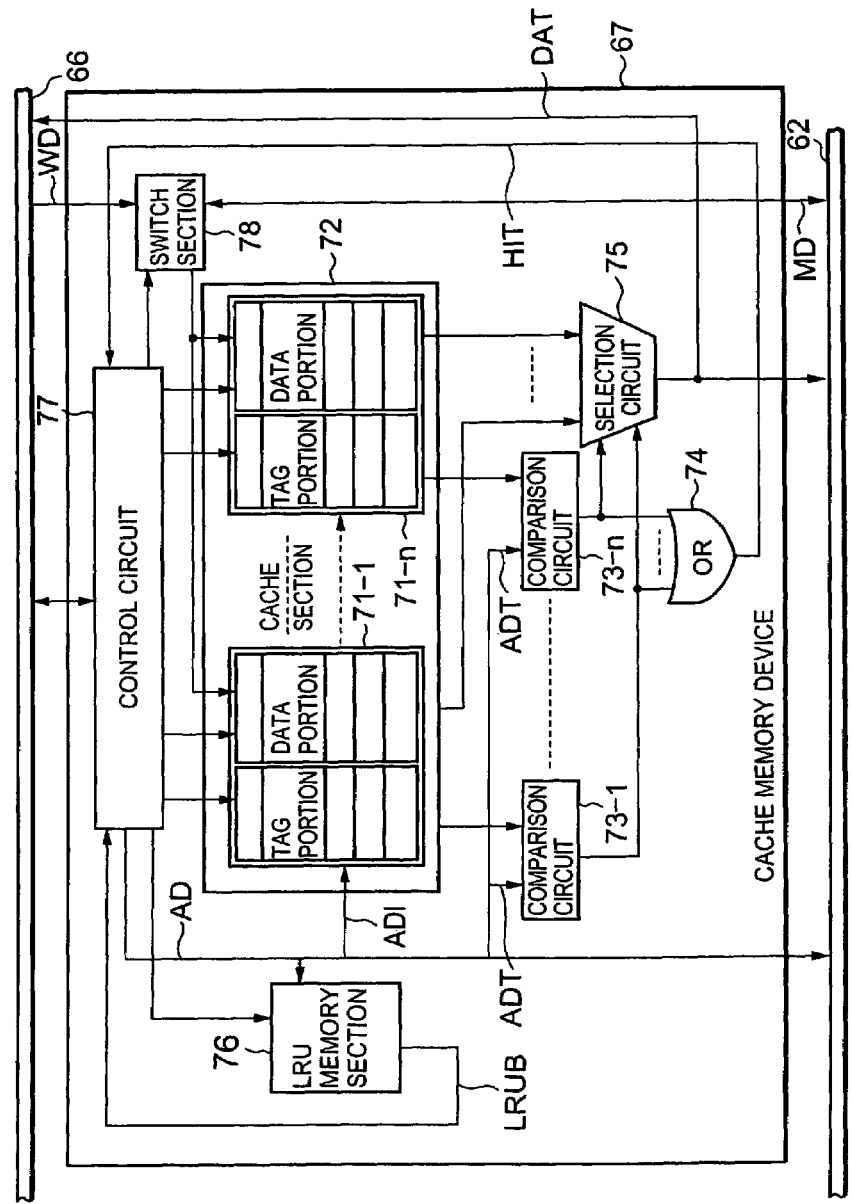
FIG. 7 is an internal block diagram of a conventional cache memory device.

FIG. 2 is an internal block diagram of a cache memory device according to the first embodiment of the invention. A cache memory device 6a, like the conventional cache memory device in FIG. 7, has an n-way cache section 22 which includes n ways from a first way 21-1 to an n-th way 21-n each including pairs of tag portions and data portions, n comparison circuits 23-1 to 23-n, an OR circuit 24 and a selection circuit 25. Each of the comparison circuits 23-1 to 23-n detects a match between a tag address stored in a tag portion that is specified by an index address ADI in an address AD, which has a tag field and an index field, and an address ADT of the tag field of the address AD. The OR circuit 24 sets a hit signal HIT active when a match is detected by those comparison circuits and sends the hit signal HIT to a control circuit 27. The selection circuit 25 selects an entry of the way that corresponds to the comparison circuit which has detected a match when an access made by the CPU 3 is a read access. The cache memory device 6a also includes an LRU memory section 26 for storing a block which belongs to a set comprising blocks of n ways that have the same index address and which has not been used for the longest period of time for each set.

In addition, the cache memory device 6a has a data attribute determining section 29 in the control circuit 27. The data attribute determining section 29 determines the attribute bit of data transferred from the network I/O unit 4 via the system bus 2 and operates a switch section 28 to allocate, by priority, data (header) affixed with "1" indicating an allocation attribute in the cache section 22. That is in the case where the tag address of the transfer destination has a hit, data is written in an associated block in the cache section 22 and the associated block is treated as dirty. In the case where there is a mishit, a block to be replaced by the LRU method is selected. When data of that block is dirty, it is written back into the main memory 8 and data of the block that is associated with the address where transfer data from the main memory 8 is written is allocated, then the transfer data is overwritten and affixed with dirty information. With regard to data affixed with a non-allocation attribute data of "0" by the DMA 5, it is first checked if there is a hit in the cache section 22. When there is a mishit, the switch section 28 is operated in such a way that the data passes through the cache memory device 6 and is output directly as data MD. The data MD is directly written in the main memory 8 via the memory interface 7. In case where there is a hit in the cache section 22, data in the cache section 22 is updated to be dirty.

In the case where the CPU 3 accesses the cache memory device 6, the CPU 3 informs whether data to be accessed is allocation attribute data or non-allocation attribute data. For every access from the CPU 3, the cache section 22 is accessed first. When there is a hit and the access type is a write access, the control circuit 27 operates the switch section 28 to rewrite the associated block into the cache section 22 and affix dirty information to the data. The data of the dirty block is written back into the main memory 8 when a mishit-originated replacement takes place. When the access type is a read access, data of an entry of the way whose tag portion has a tag address coincident with the address ADT of the tag field of the address AD is read out as read data DAT.

It is considered as a mishit when none of the tag addresses of n entries of the set that is specified by the index address ADI of the address AD matches with the address ADT of the tag field. When the switch section 28 determines that data to be accessed is allocation attribute data, a block LRUB registered as an LRU block in the LRU memory section 26 is extracted from the set that is specified by the index address ADI. Then, the tag address and data of the block of the way that is associated with the LRUB in the cache section 22 are updated to a tag address and data which are associated with the tag field of the address in the main memory 8 that is indicated by the address AD, and data selected and pushed out from the cache section 22 by the LRU method is written back into the memory address in the main memory 8 that corresponds to the index address, all under the control of the control circuit 27.

When there is a mishit and the switch section 28 determines that data to be accessed is not allocation attribute data, the main memory 8 is directly accessed via the memory interface 7 under the control of the control circuit 27. When the access type is a read access, the address AD is sent to the main memory 8 and data MD read from the main memory 8 is sent through the switch section 28 of the cache memory device 6a onto the system bus 2. When the access type is a write access, the address AD is sent to the main memory 8 and data is sent through the switch section 28 of the cache memory device 6a to the main memory 8 to be written there.

As apparent from the above, because the cache memory device 6a has a capability of selecting whether to allocate data in the cache section 22 or send data to the main memory 8 without allocation depending on the attribute bit added to the data, the cache memory device 6a can selectively store data which is very likely to be repeatedly accessed in the cache section 22, thus significantly improving the hit ratio.

Figure 3:
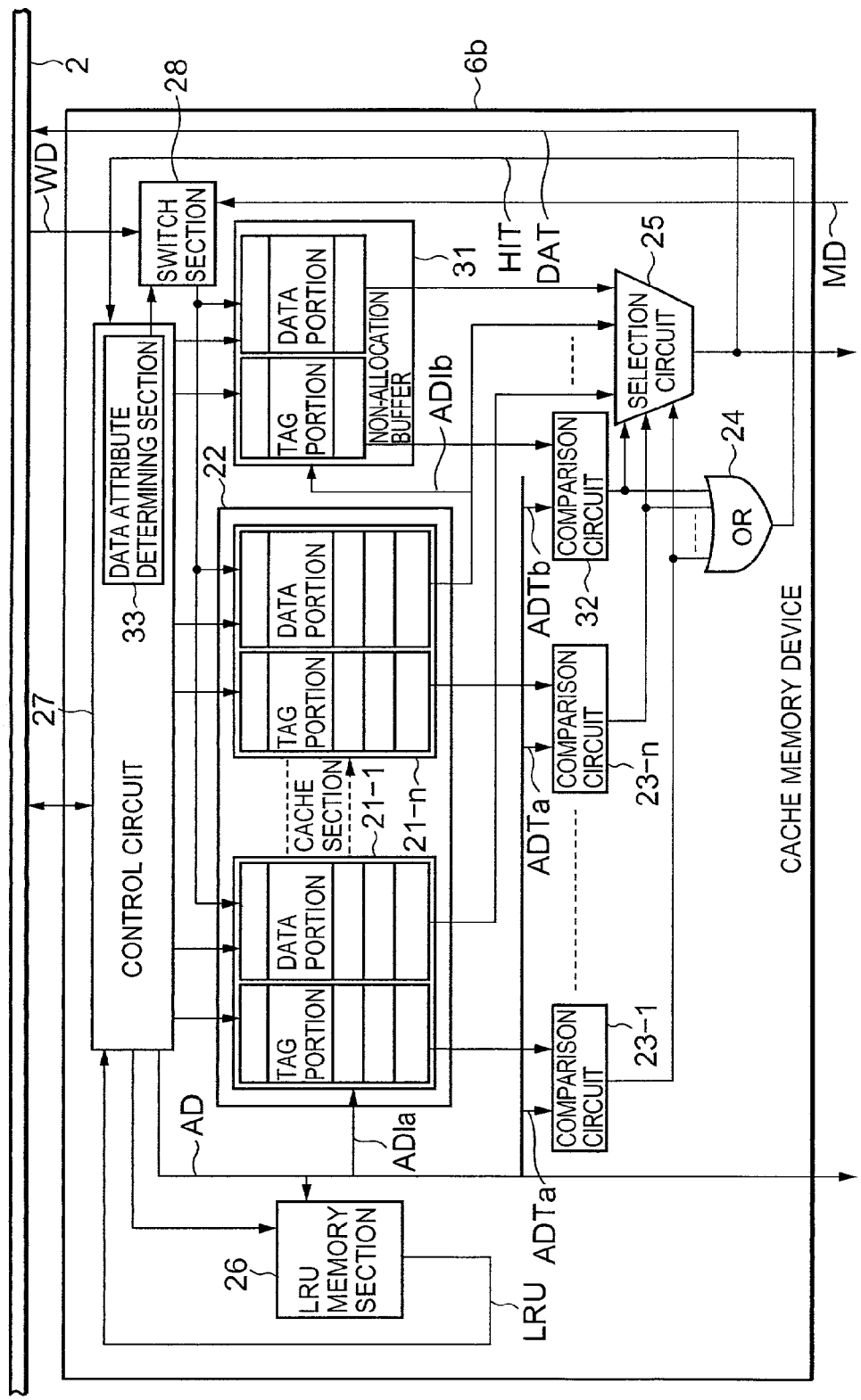
FIG. 3 is an internal block diagram of a cache memory device according to a second embodiment of the invention.

FIG. 3 is an internal block diagram of a cache memory device according to the second embodiment of the invention. A cache memory device 6b according to the embodiment has a non-allocation buffer 31 for storing non-allocation attribute data so that a part of non-allocation attribute data which is stored in the main memory 8 in the cache memory device 6a in FIG. 2 is stored in the non-allocation buffer 31. Specifically, by using a data attribute determining section 33 in the control circuit 27, the cache memory device 6b determines the attribute bit of data transferred from the network I/O unit 4 via the system bus 2 and operates the switch section 28 to allocate data affixed with "1" indicating an allocation attribute to the cache section 22. In the case where the tag address of the transfer destination has a hit, data is written in an associated block in the cache section 22 and is affixed with dirty information. In the case where there is a mishit, a block to be replaced by the LRU method is selected and is written back into the main memory 8, data of the block that is associated with the address where transfer data from the main memory 8 is written is allocated, then the transfer data is overwritten and affixed with dirty information. With regard to data affixed with non-allocation attribute data of "0", the switch section 28 is operated in such a way that the data is transferred to the non-allocation buffer 31. When the tag address of the transfer destination has a hit, the data is written in the associated block in the non-allocation buffer 31 and affixed with dirty information. When there is a mishit, an entry indicated by an index address ADIb is selected and written back into the main memory 8, data of the block that is associated with the address where transfer data from the main memory 8 is written at the associated address in the non-allocation buffer 31, then the transfer data is overwritten and affixed with dirty information.

Like each way of the cache section, the non-allocation buffer 31 has a tag portion and a data portion. It is to be noted however that the capacity of the non-allocation buffer 31 can be smaller than the capacity of a single way of the cache section 22, not to mention that the capacity of the non-allocation buffer 31 is smaller than the entire memory capacity of the cache section 22. In this case, as shown in FIG. 4B, a field which is assigned to the index address ADIb in the non-allocation buffer 31 becomes smaller than the field of an index address ADIa in the cache section 22, and the field of a tag address ADTb which is assigned to the non-allocation buffer 31 becomes greater than the field of a tag address ADTa in the cache section 22 accordingly. Therefore, the number of bits of the tag address to be stored in the tag portion of the non-allocation buffer 31 is greater than the number of bits of the tag address to be stored in the tag portion of each way in the cache section 22.

Figure 4A:
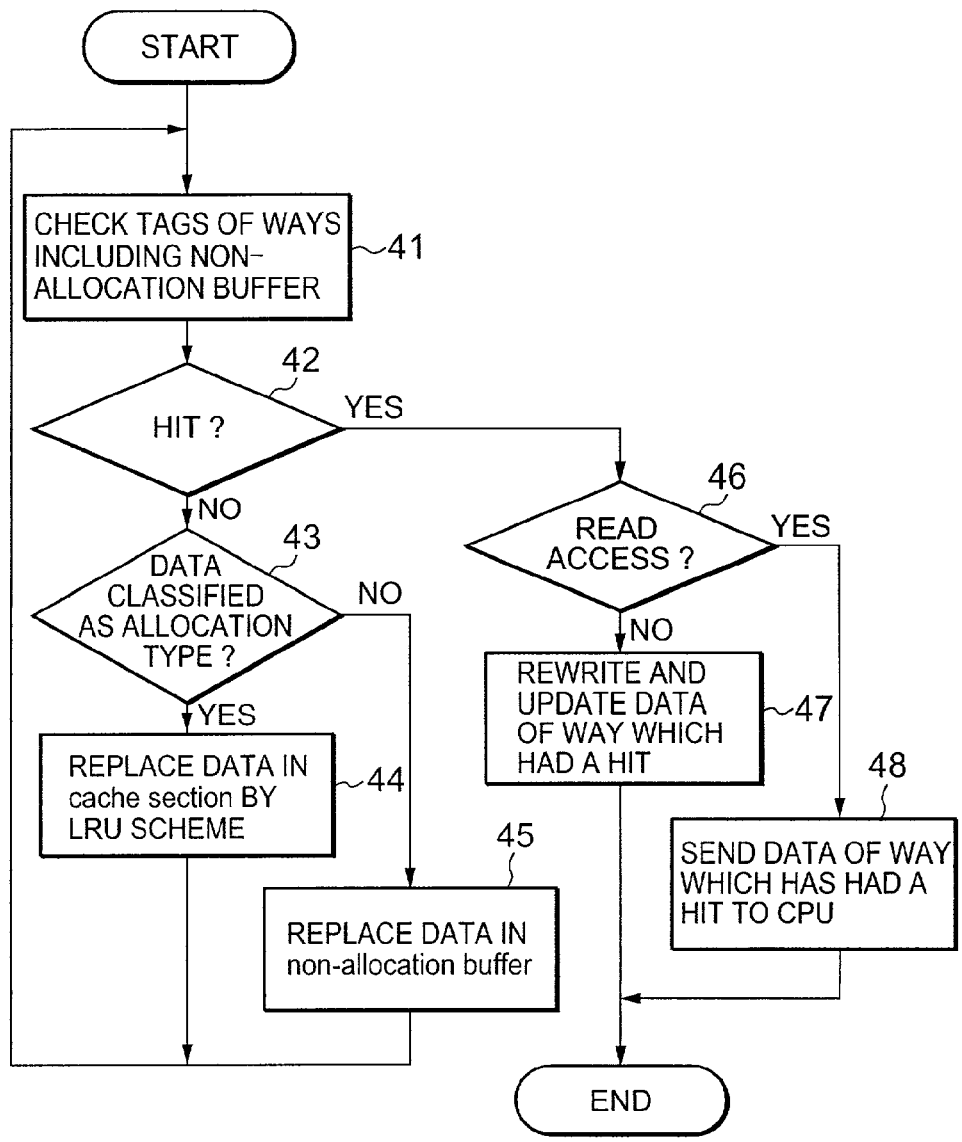
FIG. 4A is an operational flowchart of a cache memory device 6b and FIG. 4B is a diagram showing the correlation of tags and indexes in a cache section and a non-allocation buffer.
Figure 4B:
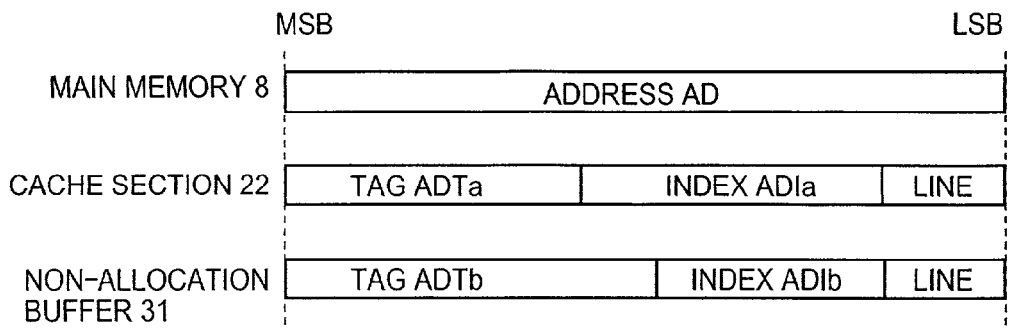

FIG. 4A is an operational flowchart of the cache memory device 6b. When the CPU 3 makes an access, in first step 41, tag addresses stored in the tag portions of n ways in the cache section 22 that are indicated by the first index address ADIa of the address AD to be accessed are compared with the address ADTa of the tag field of the address AD, tag addresses stored in the tag portions that are indicated by the index address ADIb in the non-allocation buffer 31 are simultaneously compared with the address ADTb of the address AD for the non-allocation buffer, and the OR circuit 24 sets the hit signal HIT active and outputs the signal HIT when any one of the comparison circuits 23-1 to 23-n corresponding to the n ways of the cache section 22 and a comparison circuit 32 corresponding to the non-allocation buffer 31 detects a match. In next step 42, it is determined whether or not there is a hit. When it is determined that there is a hit, the flow goes to step 46, whereas when it is determined that there is no hit, the flow goes to step 43.

In step 43, it is determined whether or not the type of data that has had a mishit is allocation attribute data. This decision is made by the data attribute determining section 33 based on the attribute of the data sent from the CPU 3 at the time an access is made. When it is determined that data to be accessed is allocation attribute data, the flow proceeds to step 44 to select a block in the cache section 22 which is to be replaced by the LRU method and replace the block with data and the tag address of the associated address in the main memory 8. The data MD from the main memory 8 is sent to the cache section 22 through the switch section 28 under the control of the control circuit 27. Data of the block that is to be pushed out from the cache section 22 is written back into the main memory 8. When it is determined in step 43 that data to be accessed is non-allocation attribute data, the flow proceeds to step 45 to replace the entry which is indicated by the index address ADIb in the non-allocation buffer 31 with data and the tag address of the associated address in the main memory 8. The data MD from the main memory 8 is sent to the non-allocation buffer 31 through the switch section 28 under the control of the control circuit 27. Data of the block that is to be pushed out from the non-allocation buffer 31 is written back into the main memory 8.

After step 44 or step 45 is finished, the flow returns to step 41. In next step 42, there is certainly a hit, so that the flow proceeds to step 46 to determine whether or not the access type is a read access. When it is not determined that the access type is a read access, the flow goes to step 47. As the access type is a write access in this case, write data WD is sent through the switch section 28 to the way in the cache section 22 that has had a hit or the non-allocation buffer 31 to be rewritten there and affixed with dirty information, after which the access process is terminated. When it is determined as a read access in step 46, data of a block in the way in the cache section 22 that has had a hit or the non-allocation buffer 31 is sent as read data DAT to the CPU 3 via the system bus 2, after which accessing by the CPU 3 is terminated.

The cache memory device 6b can store a part of data which is not affixed with an allocation attribute in the non-allocation buffer 31. Under the communication circumstance where there is a locality on time, such as a very short time involved from the transfer of a packet to the cache memory device 6b from the network I/O unit 4 to the transmission of the packet to the network I/O unit 4 from the cache memory device 6b after being processed by the CPU 3 or under the communication circumstance where there is a spatial locality, such as the same packet being frequently exchanged between a sender and a receiver, the probability of accessing communication data and a trailer while they are stored in the non-allocation buffer 31 is increased, so that the non-allocation buffer 31 effectively serves as a cache memory for non-allocation attribute data. This can also shorten the access time for non-allocation attribute data. In the case where the non-allocation buffer 31 is designed to have the same structure as that of a single way of the cache section 22, memory blocks of the ways in the cache section 22 can be used directly as if the non-allocation buffer 31 served as a (n+1)-th way in the cache section 22. In addition, the index field and tag field of the address AD can be made common and the comparison circuits 23-1 to 23-n can be used for the comparison circuit 32. This brings about an advantage of reducing the number of design steps.

Figure 5A:
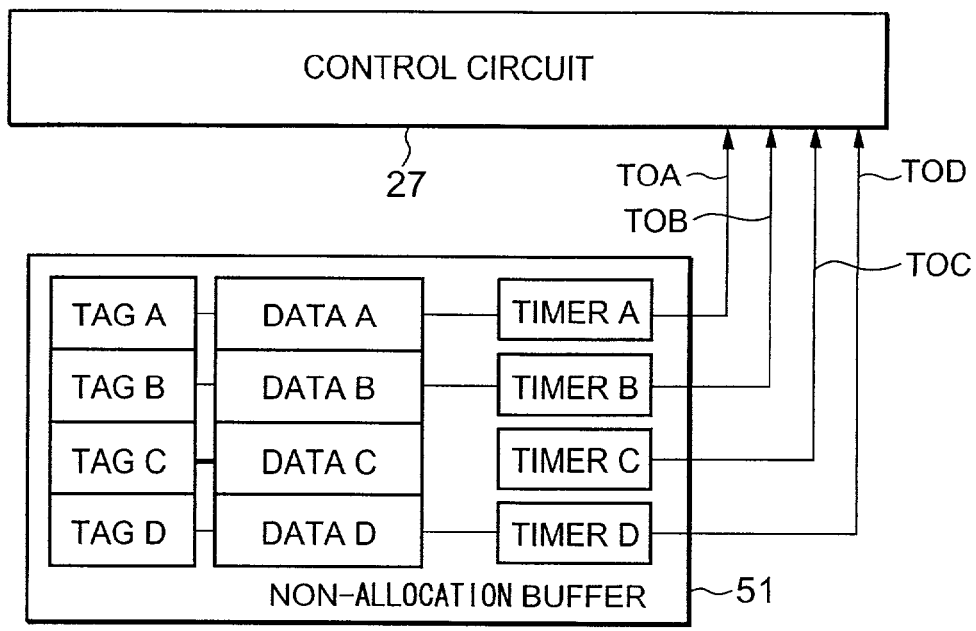
FIGS. 5A and 5B are internal block diagrams of different examples of the non-allocation buffer.
Figure 5B:
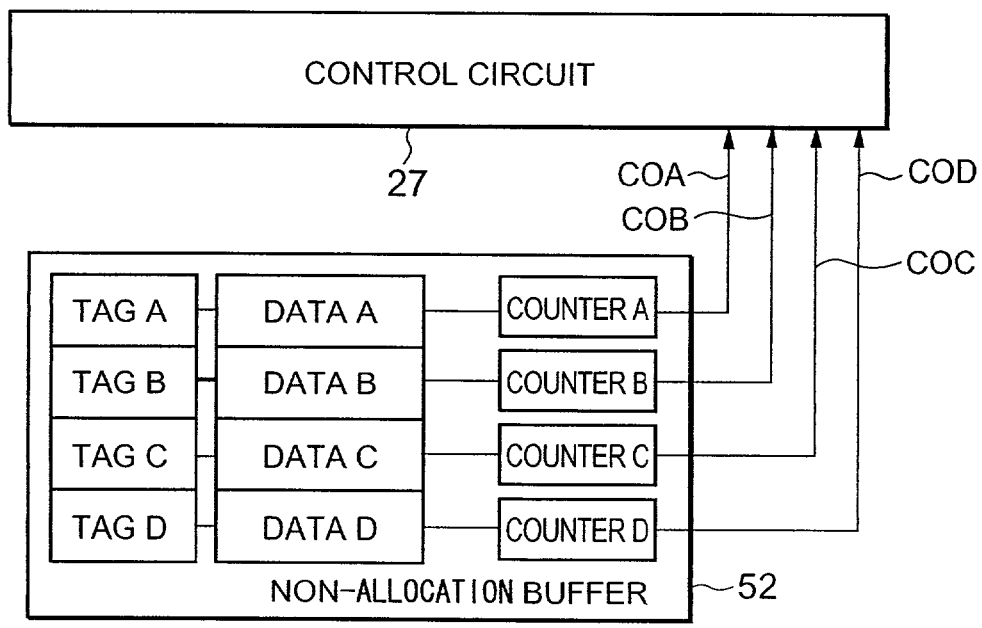

FIGS. 5A and 5B are internal block diagrams of different examples of the non-allocation buffer. A non-allocation buffer 51 in FIG. 5A has a memory area where four pairs of tags and data can be entered and a timer is provided for each tag and data pair. The non-allocation buffer 51 in this example restricts the time for non-allocation attribute data to stay in the non-allocation buffer. In case where the CPU 3 makes an access to an address whose index address corresponds to a pair of a tag B and data B and the tag address does not have a match, resulting in a mishit and replacement of data between the non-allocation buffer 51 and the main memory 8, the timer is activated in the non-allocation buffer 51 at the point of time when data replacement has taken place. When a preset time is measured, the control circuit 27 is informed of a time-out TOB and non-allocation attribute data is written back into the main memory 8. As data whose access probability can be considered as having become smaller is written back into the main memory beforehand, a process of writing data stored so far in the non-allocation buffer 51 back into the main memory 8 can be eliminated at the time of transferring a packet from the network I/O unit 4. This prevents the effectiveness of the provision of the non-allocation buffer from being deteriorated under the communication circumstance where there is a time locality or spatial locality. The non-allocation buffer 51 may be designed in such a way that the timer is reset and restarts every time there is a hit and the buffer 51 is accessed, and the control circuit 27 is notified of the time-out TOB and non-allocation attribute data is written when the preset time is measured.

A non-allocation buffer 52 in FIG. 5B has a memory area where four pairs of tags and data can be entered and a counter is provided for each tag and data pair. In the non-allocation buffer 52 of this example, when non-allocation attribute data has been accessed a preset number of times, it is determined that further accessing to the non-allocation attribute data is less likely to occur, the non-allocation attribute data is written back into the main memory 8. Predetermined values are set in counters A to D beforehand, the counter value of the counter B is counted down by "1" every time an access made by the CPU 3 has a hit with respect to a pair of the tag B and data B, the control circuit 27 is notified of a count-out COB and the data is written back into the main memory 8 when the counter value reaches "0". As per the example in FIG. 5A, at the time of transferring a packet from the network I/O unit, it is possible to eliminate a process of writing data stored so far in the non-allocation buffer 52 back into the main memory 8. Because data, such as a video stream, has a characteristic that the data, once written and read out, will not be accessed again, the feature is effective under the circumstance where such packet data is frequently processed.

Although the foregoing description in conjunction with FIGS. 5A and 5B has been given of the case where there are four pairs of tags and data, the number of pairs is in no way limited to four.

Because the cache memory device according to the invention selectively stores data which is considered as likely to be frequently used in the cache section, the hit ratio of the cache memory device is improved, thus reducing the number of shifts/replacements of data.

Further, the data processing apparatus according to the invention separates data input to the I/O unit to data which is determined as being likely to be used and data which is determined as being less likely to be used and directly exchanges the data with the cache memory device of the invention. This can further reduce the number of shifts/replacements of data between the cache memory device and the main memory and thus demonstrates a significant effect of improving the performance of the communication control processing.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A cache memory device, provided between a CPU and a main memory, for operating as a fast buffer memory, said cache memory device comprising:
   a cache section for storing a tag and data as a pair; and
   a control circuit having a data attribute determining function, wherein input data is stored in said cache section when said control circuit determines that attribute information affixed to said input data by a Direct Memory Access (DMA) indicates a predetermined attribute, said input data is transferred to said main memory when said control circuit determines that said attribute information of said input data does not indicate said predetermined attribute, and when there is a reading access or an external writing access, said cache section is accessed first, and,
   in a case where a mishit occurs and said control circuit determines that attribute information of data to be accessed indicates said predetermined attribute, a block to be replaced is selected from said cache section by a predetermined method and a tag and data of said block to be replaced are replaced with a tag of an access address where said reading or writing access has been made and data is stored at an access address of said main memory, then a process for said reading or writing access is executed, and,
   in a case where a mishit occurs and said control circuit determines that said attribute information of said data to be accessed does not indicate said predetermined attribute, permitting transmission and reception of those address and data which are associated with said reading or writing access to and from said main memory without intervention of said cache section.

2. The cache memory device according to claim 1, wherein said cache section has n ways into each of which entries of a predetermined number of tag and data pairs can be made, where n is a positive integer equal to or greater than 2.

3. A cache memory device, provided between a CPU and a main memory, for operating as a fast buffer memory, said cache memory device comprising:
   a cache section for storing a tag and data as a pair;
   a non-allocation buffer which has a smaller capacity than that of said cache section and stores a tag and data as a pair; and
   a control circuit having a data attribute determining function, wherein input data from a Direct Memory Access (DMA) is stored in said cache section when said control circuit determines that attribute information affixed to said input data indicates a predetermined attribute, said input data is stored in said non-allocation buffer when said control circuit determines that said attribute information of said input data does not indicate said predetermined attribute, and when there is a reading access or an external writing access, said cache section and said non-allocation buffer are simultaneously accessed first,
   in a case where a mishit occurs and said control circuit determines that attribute information of data to be accessed indicates said predetermined attribute, a block to be replaced is selected from said cache section by a predetermined method and a tag and data of said block to be replaced are replaced with a tag of an access address where said reading or writing access has been made and data is stored at an access address of said main memory, then a process for said reading or writing access is executed, and in a case where a mishit occurs and said control circuit determines that said attribute information of said data to be accessed does not indicate said predetermined attribute, a block indicated by an index address of said non-allocation buffer is treated as a block to be replaced, said tag and data of said block to be replaced are replaced with said tag of said reading or writing access address and data stored at said access address of said main memory, then said process for said reading or writing access is executed.

4. The cache memory device according to claim 3, wherein said non-allocation buffer is additionally provided with a timer in association with each of a pair of said tag and data, starts said timer at a time data replacement occurs between said non-allocation buffer and said main memory, and writes data stored by said replacement back into said main memory when said timer measures a preset time.

5. The cache memory device according to claim 3, wherein said non-allocation buffer is additionally provided with a timer in association with each of a pair of said tag and data, starts said timer every time there is a hit and said non-allocation buffer is accessed, and writes data at an associated address back into said main memory when said timer measures a preset time.

6. The cache memory device according to claim 3, wherein said non-allocation buffer is additionally provided with a counter in association with each of a pair of said tag and data for counting a number of accesses, and writes data at that address whose number of accesses has reached a preset access number into said main memory.

* * * * *